(12) United States Patent
Feng et al.

(10) Patent No.: US 10,599,613 B2
(45) Date of Patent: Mar. 24, 2020

(54) INDEX MANAGEMENT IN STORAGE SYSTEM

(71) Applicant: INTERNATIONAL BUSINESS MACHINES CORPORATION, Armonk, NY (US)

(72) Inventors: Shuo Feng, Beijing (CN); Zi Qiang Gu, Beijing (CN); Zhi Hong Ma, Beijing (CN); Zhiyong Tian, Beijing (CN); Yan Zhang, Beijing (CN); Jia Wei Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/787,843

(22) Filed: Oct. 19, 2017

(65) Prior Publication Data

US 2019/0121872 A1 Apr. 25, 2019

(51) Int. Cl.
*G06F 17/20* (2006.01)
*G06F 16/13* (2019.01)

(52) U.S. Cl.
CPC .................................. *G06F 16/13* (2019.01)

(58) Field of Classification Search
USPC ....................................................... 707/792
See application file for complete search history.

(56) References Cited

U.S. PATENT DOCUMENTS

| | | | |
|---|---|---|---|
| 6,738,871 B2 | 5/2004 | Van Huben et al. | |
| 6,961,739 B2 * | 11/2005 | Lee | G06F 16/13 707/830 |
| 7,023,979 B1 * | 4/2006 | Wu | H04M 3/5233 379/265.11 |
| 7,774,388 B1 * | 8/2010 | Runchey | G06F 16/95 707/811 |
| 8,935,476 B2 * | 1/2015 | Benhase | G06F 12/128 711/119 |
| 9,165,015 B2 * | 10/2015 | Kauffman | G06F 3/0611 |
| 9,189,501 B2 * | 11/2015 | Runchey | G06F 16/367 |
| 9,361,346 B2 * | 6/2016 | Andersson | G06F 16/258 |

(Continued)

OTHER PUBLICATIONS

Wang et al., "OBFS: A File System for Object-based Storage Devices", 21st IEEE/12th NASA Goddard Conference on Mass Storage Systems and Technologies, (MSST2004), Apr. 2004, pp. 1-18.

(Continued)

*Primary Examiner* — Kim T Nguyen
(74) *Attorney, Agent, or Firm* — Michael A. Petrocelli

(57) ABSTRACT

Embodiments of the present disclosure relate to methods, systems, and computer program products for storage management. In one embodiment, a computer-implemented method is disclosed. According to the method, in response to receiving a request related to managing the at least one directory entry in the file system, at least one directory entry in a file system may be determined by a file system in a storage system, where each of the at least one directory entry is represented by digital numbers. An index for each of the at least one directory entry may be managed in the file system by the file system, where an index key for the index comprises the digital numbers themselves. In other embodiments, a computer-implemented system and a computer program product for managing the index are disclosed.

20 Claims, 6 Drawing Sheets

(56) References Cited

U.S. PATENT DOCUMENTS

| | | |
|---|---|---|
| 9,367,551 B2 | 6/2016 | Beaverson et al. |
| 9,471,580 B2 * | 10/2016 | Shogome ................ G06F 16/16 |
| 9,613,207 B2 * | 4/2017 | Hwang ................... G06F 21/50 |
| 9,626,385 B2 * | 4/2017 | Runchey ............... G06F 16/367 |
| 2013/0185258 A1 | 7/2013 | Bestler et al. |
| 2014/0059005 A1 | 2/2014 | Carmichael |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

INDEX MANAGEMENT IN STORAGE SYSTEM

BACKGROUND

The present disclosure generally relates to storage management. Specifically, the present disclosure relates to methods, systems and computer program products for managing an index in a storage system.

With the development of networking and storage technologies, an increasing number of applications may produce and consume a large amount of data. This data includes online video, social media, and user-uploaded content, which contribute to the need for easily accessible storage systems. An example of which is Object Storage. During operations of the storage system, an index may record locations at which files corresponding to the objects are stored in the storage system, and the index may be used to quickly access needed files. Accordingly, how to manage the index may be a focus in the field of storage systems.

SUMMARY

In one aspect of the present invention, a method is disclosed. According to the method, in response to receiving a request related to managing at least one directory entry in the file system, the at least one directory entry in a file system may be determined first by a file system in a storage system, where each of the at least one directory entries is represented by digital numbers. An index for each of the at least one directory entries may be managed in the file system by the file system, where an index key for the index comprises the digital numbers themselves.

In another aspect of the present invention, a system is disclosed. The computing system comprises a computer processor a computer-readable storage medium, and program instructions stored on the computer-readable storage medium being executed by the processor, to cause the computer system to perform a method. According to the method, in response to receiving a request related to managing at least one directory entry in the file system, the at least one directory entry in a file system may be determined by a file system in a storage system, where each of the at least one directory entries is represented by digital numbers, and then an index for each of the at least one directory entries may be managed in the file system by the file system, where an index key for the index comprises the digital numbers themselves.

In another aspect, a computer program product is disclosed. The computer program product comprises a computer readable storage medium having program instructions embodied therewith. The computer readable storage medium is not a transitory signal per se. The program instructions are executable by a computer to cause the computer to perform a method including: determining, by a file system in a storage system, at least one directory entry first in a file system in response to receiving a request related to managing the at least one directory entry in the file system, where each of the at least one directory entries is represented by digital numbers; and managing, by the file system, an index for each of the at least one directory entries in the file system, where an index key for the index comprises the digital numbers themselves.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
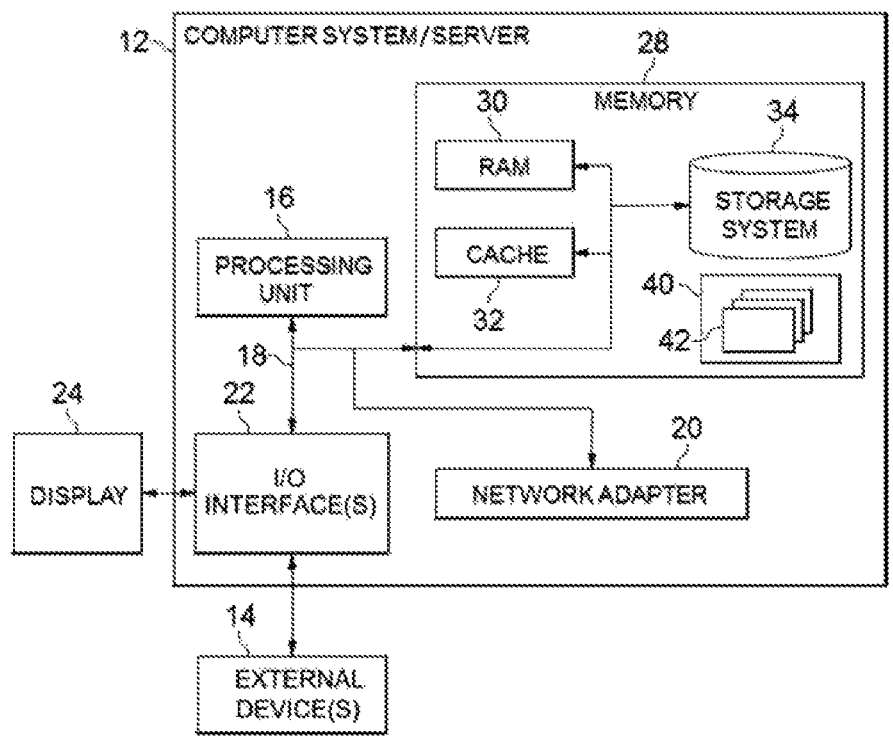
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an embodiment of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
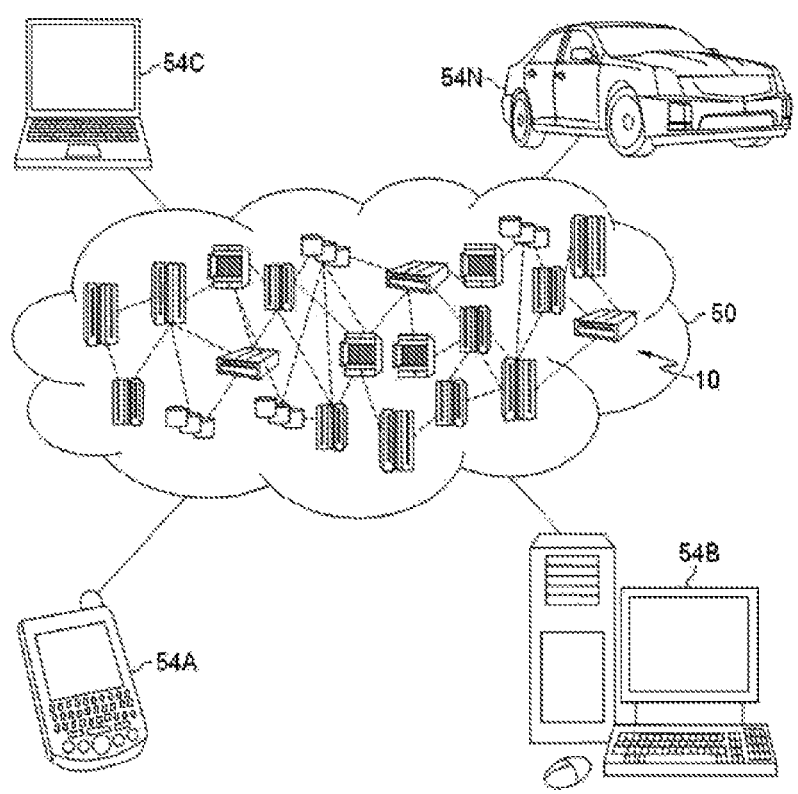
FIG. 2 depicts a cloud computing environment according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
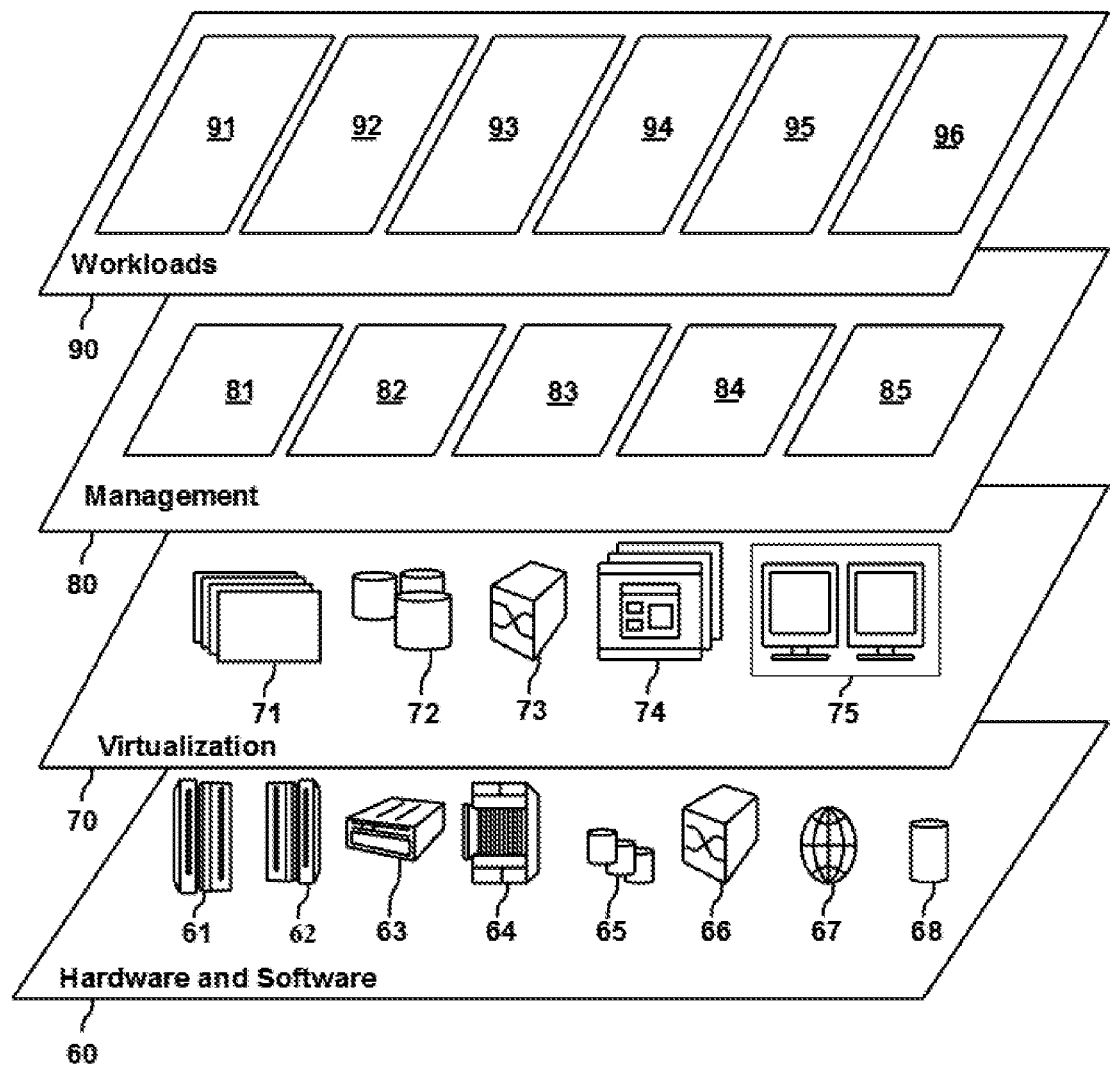
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and index processing 96. It is to be understood that, although the index processing 96 may be implemented in a cloud environment, in another situation, the index processing 96 may also be implemented in a centralized storage system.

The object storage system features a highly scalable architecture and also benefits from the easy access Hyper Text Transportation Protocol (HTTP) interface. Typically, each object includes the data itself, a variable amount of metadata, and a globally unique identifier (OID—Object ID). The OID may be a variable length string included in the HTTP request, which may be used to address the object uniquely.

For the purpose of description, detailed descriptions will be presented to various embodiments of the present disclosure in a storage system (such as a cloud storage system or a centralized storage system), where the object may be stored in the storage system in response to an HTTP request for storing the object. There are many ways to implement the data distribution in an object storage system, while most embodiments rely on a digest of the OID that is determined from a hash algorithm. For example, but not limited here, the MD5 or SHA hash algorithms may generate the digest of the OID and then decide a path in the storage system at which the object may be stored. Taking the MD5 hash as an example for generating the digest of the OID, the MD5 is a 64-bit value generated from a variable length string. Further, the path may be determined from the MD5 value, where the MD5 value may be mapped to a physical location in the storage system.

Figure 4:
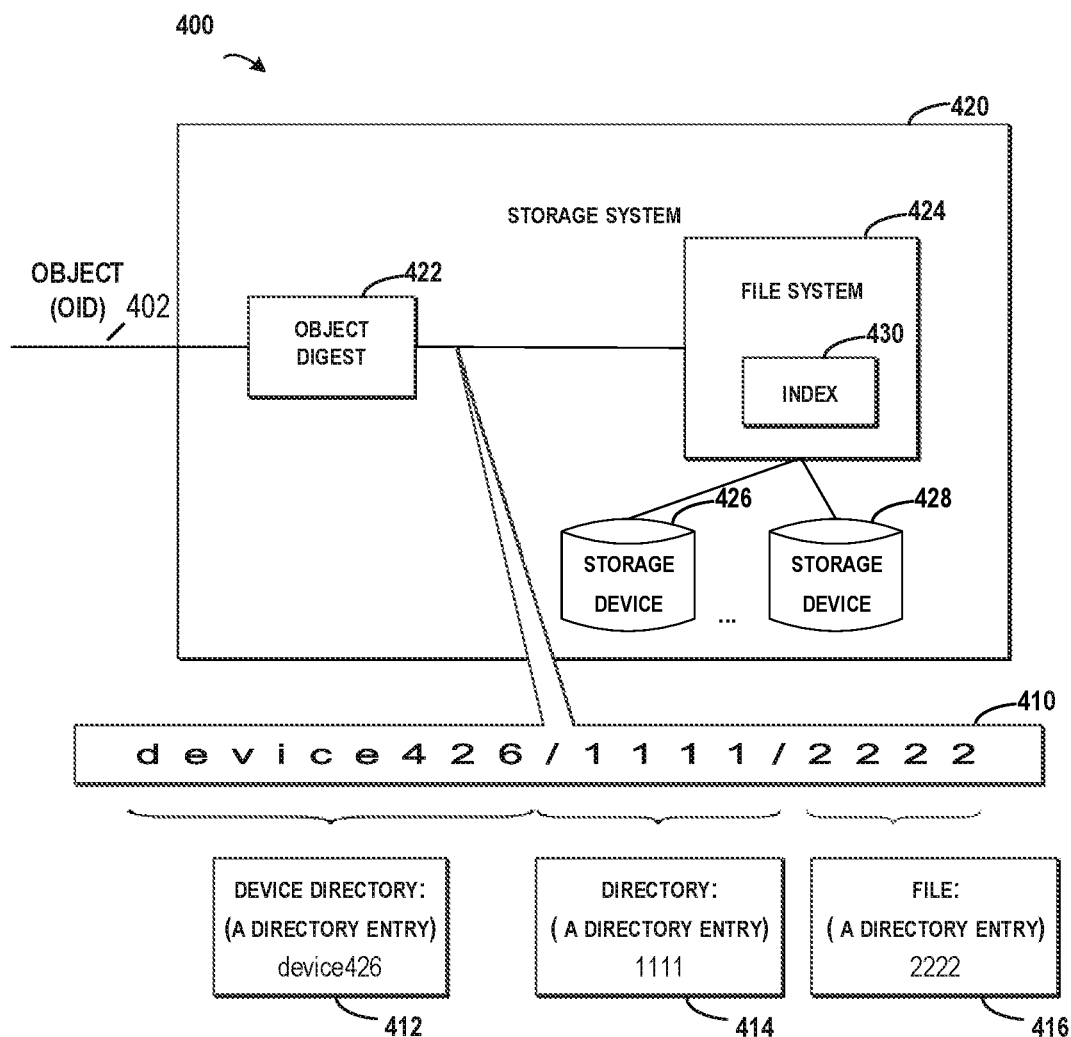
FIG. 4 depicts an example diagram of storing an object in a storage system.

Reference will be made to FIG. 4 to describe a general procedure for storing an object in a storage system 420. When a user sends a request for storing the object into the storage system 420, an HTTP request including an OID 402 of the object may be sent. A digest 422 may be determined based on the OID 402 that is included in the request. The storage system 420 may determine, based on the digest, a path 410 at which the object may be stored in one of storage devices (such as the storage devices 426, ..., 428) in a file system 424 in the storage system 420.

However in a general storage system, the path 410 is represented by a string with a variable length, and the location at which the object is stored in the storage system depends on the directory entry/entries included in the path 410. Here, one type of the directory entry may indicate a directory in the path for storing the object, and another type may indicate the file corresponding to the object. The number of the directory entries may vary for different paths. In order to manage the objects in the storage system, an index 430 implemented by for example, B tree or B+ tree may be built in the file system 424 in the storage system 420. The object may be saved as a file in one of storage devices such as 426, ..., 428 etc. Here in FIG. 4, the index 430 may record a location of the file, and it may provide a fast access to the file when necessary.

Usually, the complexity for managing the index 430 may depend on the number of the directory entries as well as the cost in generating a digest for each directory entry since the digest can be used as an index key for the corresponding index for the directory entry. In the context of the present disclosure, the index key may also be referred to as a key for simplicity. Taking the path 410 "device426/1111/2222" as an example, when the object 422 is stored into the path 410 in the storage system 420, three digests should be generated for "device426," "1111," and "2222," respectively. Sometimes, the number of the directory entries may be great, and if there are a lot of objects to be stored in the storage system 420, the cost in determining the digest cannot be neglected and thus may result in considerable overhead in the time and computing resources.

In order to at least partially solve the above and other potential problems, the inventors consider if the path 410 "device426/1111/2222" can be determined based on the digest of an object, some of its directory entry may be digital numbers, the cost in generating a digest for some directory entries may be saved since the digital numbers can be used as the index key for the corresponding index for the directory entry. Thus a new method and system are disclosed herein for managing the index in the storage system. In the method, at least one directory entry in a file system may be determined in response to receiving a request related to managing the at least one directory entry in the file system, where each of the at least one directory entry is represented by digital numbers. Further, an index for each of the at least one directory entry may be managed in the file system, where an index key for the index comprises the digital numbers themselves.

In the present disclosure, it is not necessary to generate digests for a type of directory entries that may be represented by digital numbers. Accordingly, for a path that including this type of directory entries, the cost for determining the digests may be avoided.

Referring to FIG. 4, the path 410 "device426/1111/2222" may be determined from a HTTP request for storing the object. According to the present disclosure, the path 410 may include three directory entries: a device directory 412 "device426" that indicates a parent directory in which the file corresponding to the object may be stored; a directory 414 "1111" that indicates a directory in which the file may be stored in the device directory 412; and a file 416 "2222" that indicates of a file name for the object. Here, a character "/" may be used as a separator for separating each directory entry.

From the structure 400 as shown in FIG. 4, when the path 410 is determined from an OID 402 included in the HTTP request, two of the three directory entries 412, 414, and 416 are already represented by digital numbers. Here, because both of "1111" and "2222" are already represented by digital numbers 0x1111 (the prefix "0x" indicates that "1111" is a hexadecimal number) and 0x2222, in the index 430, index keys for the directory entries 414 and 416 may be directly represented by "0x1111" and "0x2222" without the need of generating digests.

It is to be understood that, the digital numbers "0x1111" and "0x2222" are just examples that are obtained from the OID 402 according to an example hash algorithm, and they are only for the purpose of illustration without limitation. In another example, the digital numbers may include more or less digit positions, and each digit position may represent another value. For example, the digital numbers may be of a binary number, a quaternary number, an octal number, a decimal number, a hexadecimal number, and so on. In one example, when the OID 402 is generated by a certain hash algorithm, the path obtained from the OID 402 may be "z1device27/328/47a/ca09fd8f37d31791955f7cb6c64c447a." Here, the directory entries are in the format of hexadecimal numbers.

Instead of the directory entry being a string, in the present disclosure, the directory entry that is represented by digital numbers may be directly considered as digital numbers and used as the index key for the index, thereby the step for generating the digest based on the hash algorithm may be omitted. At this point, the time cost and the overhead of computing resources in generating the digest may be saved, further the overall performance of the storage system may be increased.

Figure 5A:
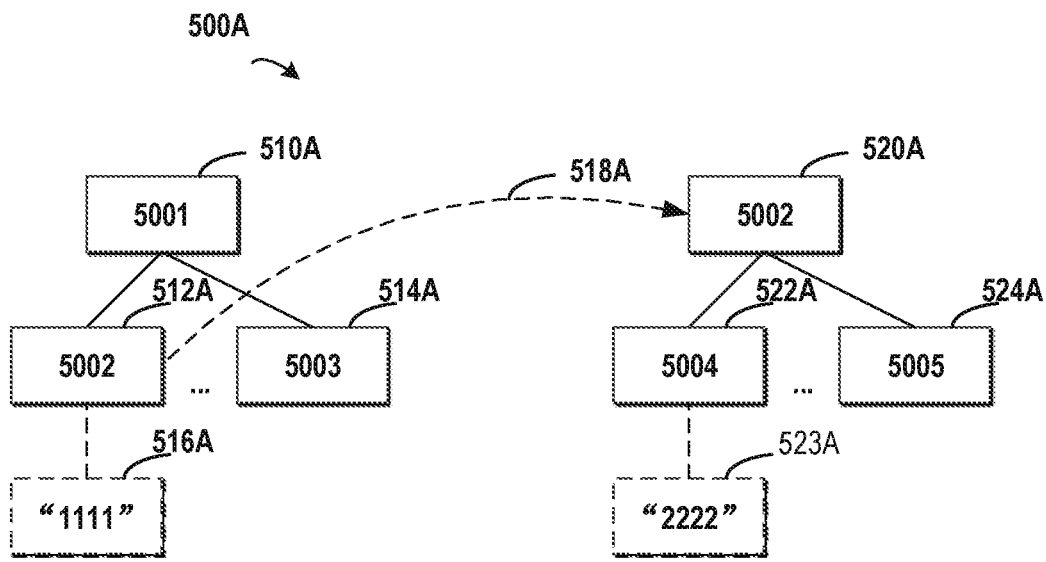
FIG. 5A depicts an example index in a storage system.

Reference will be made to FIGS. 5A (500A) and 5B (500B) to describe details of the index of in one embodiment of the present disclosure. First refer to FIG. 5A, which depicts an example index in a normal storage system. In the normal storage system, indices 510A and 520A are provided for managing the file corresponding to the path 410. In FIG. 5A, it is supposed that the index key "5001" in the index 510A is a digest that is generated from a hash of "device426," the index key "5002" in the index 512A is a digest that is generated from a hash of "1111." Index key "5002" may be linked to other index keys as shown by 518A. Here, the index 510A may include indices 512A, and 514A. The index key "5003" is included in the index 514A.

The index 520A may include indices 522A, and 524A, which includes an index key "5005." Here, the index 512A is linked to the index 520A, which is the index for the directory "1111." and the index 512A has a pointer to indicate the string of the index 512A is "1111" in node 516A. Further, the index 520A may include an index 522A, which includes an index key "5004" in the index 522A for the file "2222." The index 522A has a pointer to indicate the string of the index 522A is "2222" in node 523A.

Figure 5B:
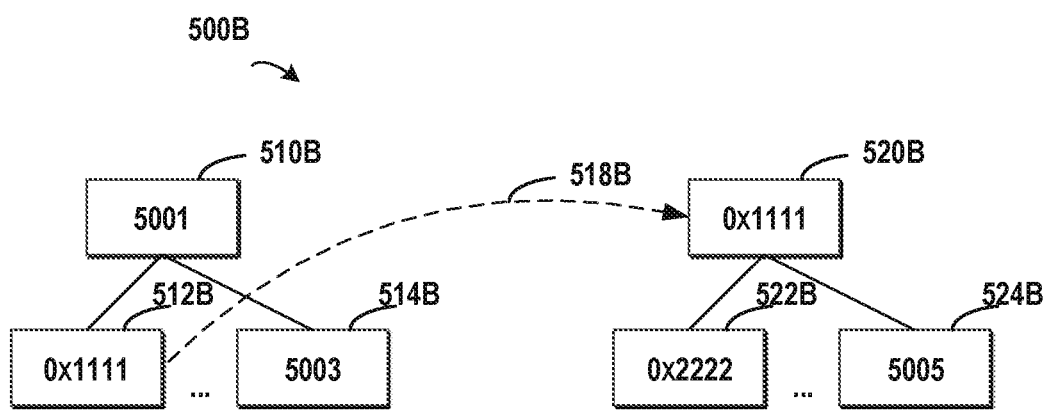
FIG. 5B depicts an example index that is managed according to one embodiment of the present disclosure.

Compared with the index of FIG. 5A, FIG. 5B provides a new way to manage the index according to one embodiment of the present disclosure. In the example of the path 410 "device426/1111/2222," as the directory "1111" and the file "2222" are already represented by digital numbers, the digital numbers may be directly used as index keys for the indexes without generating the digests. In the index 510B of FIG. 5B, the digital numbers "0x1111" may be directly used as the index key for the index 520B (as represented by 518B), and the digital numbers "0x2222" may be directly used as the index key for the index 522B. In this manner, the index in the storage system may be simplified in which the string pointer nodes (512B, 514B, and 524B, respectively) can be omitted.

Figure 6:
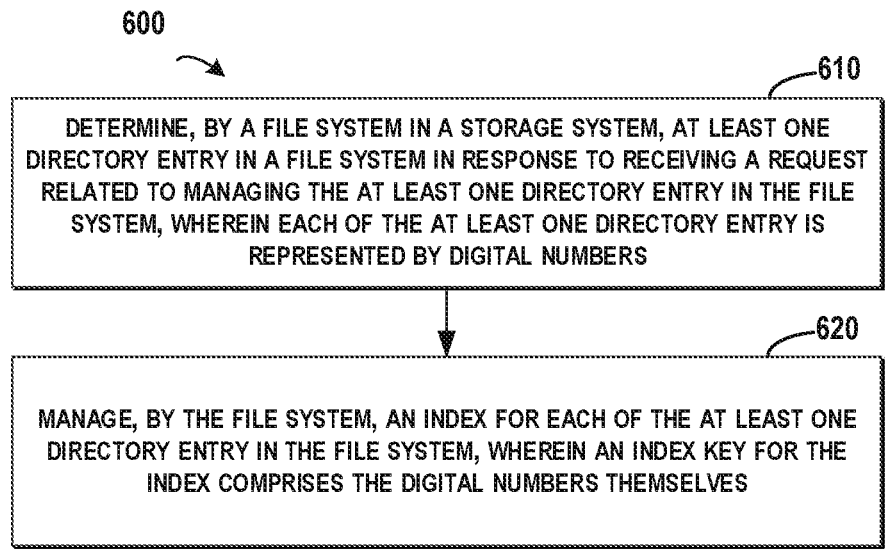
FIG. 6 depicts a flowchart of a method for managing an index in a storage system according to one embodiment of the present disclosure.

Details of the present disclosure will be described with reference a flow chart of a method 600, in FIG. 6. At a block 610, at least one directory entry in a file system may be determined in response to receiving a request related to managing the at least one directory entry in the file system, where each of the at least one directory entry is represented by digital numbers. Continuing the example of the path 410 "device426/1111/2222," the directory entries 414 and 416 are represented by the digital numbers "0x1111" and "0x2222," respectively.

At a block 620, an index for each of the at least one directory entry may be managed in the file system 424, where an index key for the index comprises the digital numbers themselves. In the embodiment, as the names of the directories and/or files have already been represented by the hexadecimal number, the names may be directly considered as hexadecimal numbers without a need to generate a hexadecimal digest. It is to be understood that the path 410 with a number of three is only an example. In another example, the path 410 may include more or less directory entries.

In one embodiment of the present disclosure, the directory entry may be directly considered as digital numbers instead of strings, and then the digital numbers representing the directory entry may be directly used as the index key for the index, such that the step of generating the digest may be omitted.

It is to be understood that the operations of the storage system 420 may relate to storing the object into the storage system 420, reading the object from the storage system 420, updating the object in the storage system 420, and deleting the object in the storage system 420, list directories, create a directory, delete a directory, etc. Therefore, the managing the index may include several aspects corresponding to the above operations, such as creating an index, reading the index, updating the index, and deleting the index.

In one embodiment of the present disclosure, in response to the request being a request related to creating the at least one directory entry, an index for each of the at least one directory entry may be created. Here, an index key for the index comprises the digital numbers themselves as will be described with reference to FIG. 7.

Figure 7:
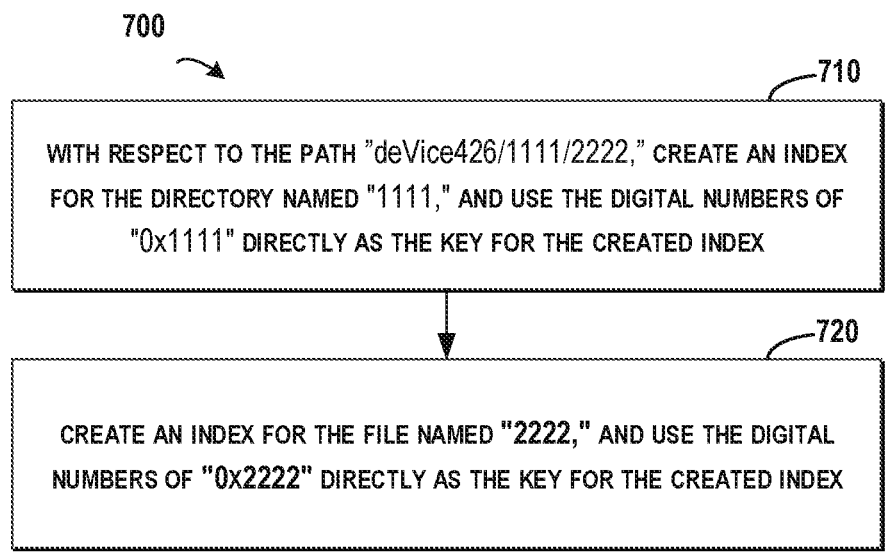
FIG. 7 depicts a flowchart of a method for creating an index in the storage system according to one embodiment of the present disclosure.

FIG. 7 depicts an example flowchart of a method 700 for creating an index in the storage system 420 according to one embodiment of the present disclosure. In response to a request for storing the object in the storage system, the path 410 may be obtained first. In the path 410, "device426" indicates the device directory in which the object may be stored. As it is not represented by digital numbers, the index for it may be managed in a normal manner. Further, the two directory entries "1111" and "2222" that follow "device426" may be managed according to the embodiments of the present disclosure.

At block 710, with respect to the directory entry "1111" (which indicates a directory), a directory with the name "1111" may be created in the "device426" in the storage system 420. Then an index may be created for the directory named "1111." Here, the digital numbers "0x1111" may be directly used as the index key for the created index. With respect to the directory entry "2222" which follows "1111," it indicates a file, and then a file with the name "2222" may be saved in the directory named "1111" in the storage system 420. At block 720, an index may be created for the file named "2222." Here, the digital numbers "0x2222" may be directly used as the index key for the created index for the file.

It is to be understood that, FIG. 7 only illustrates the method for creating the index in the storage system 420. Further, in response to other requests such as reading an object, updating an object, or deleting an object, the index may be managed similarly. In one embodiment of the present disclosure, in response to the request being a request related to reading the at least one directory entry, an index for each of the at least one directory entry may be read. Here, the index key for the index comprises the digital numbers themselves.

In one embodiment of the present disclosure, a request for reading the file at the path of "device426/1111/2222" is received. At this point, the index may be read so as to find the location of the file in the storage system 420. The location of the directory named "device426" may be found by querying the index for "device426." At this point, the digest of "device426" is used as the index key during querying the index, because "device426" is not represented by digital numbers. Then, in order to find the location of the directory "1111," the digital numbers "0x1111" may be directly used as the index key for querying the index for the directory named "1111." Further, the location of the file named "2222" may be found by directly using the digital numbers "0x2222" as the index key for query the corresponding index.

In one embodiment of the present disclosure, in response to the request being a request related to updating the at least one directory entry, an index for each of the at least one directory entry may be updated. Here, the index key for the index comprises the digital numbers themselves. Once the location of the file is found, the file may be read out.

For example, a request for updating the file at the path of "device426/1111/2222" is received. At this point, the index may be query so as to find the location of the file in the storage system 420. The location of the directory named "device426" may be found by query the index for "device426." At this point, the digest of "device426" is used as the index key during querying the index, because "device426" is not represented by digital numbers. Then, in order to find the location of the directory "1111," the digital numbers "0x1111" may be directly used as the index key for querying the index for the directory named "1111." Further, the location of the file named "2222" may be found by directly using the digital numbers "0x2222" as the index key for query the index for the file named "2222."

Once the location of the file is found, the file may be updated. In the updating, if the name of the file is updated, for example, being updated from "2222" to "3333," then the index key for the index of the file may be updated to "0x3333." At this point, the path for the updated file may be "device426/1111/3333."

In one embodiment of the present disclosure, in response to the request being a request related to deleting the at least one directory entry, an index for each of the at least one directory entry may be deleted. Here, the index key for the index comprises the digital numbers themselves. Once the location of the file is found, the file may be deleted.

For example, a request for deleting the file at the path of "device426/1111/2222" is received. At this point, the index may be query so as to find the location of the file in the storage system 420. The location of the directory named "device426" may be found by query the index for "device426." At this point, the digest of "device426" is used as the index key during querying the index, because "device426" is not represented by digital numbers. Then, in order to find the location of the directory "1111," the digital numbers "0x1111" may be directly used as the index key for querying the index for the directory named "1111." Further, the location of the file named "2222" may be found by directly using the digital numbers "0x2222" as the index key for query the index for the file named "2222." Once the location of the file is found, the file may be deleted and the index for the file may also be deleted.

In one embodiment of the present disclosure, the request may further comprise a flag indicating that the at least one directory entry is represented by digital numbers. In another embodiment of the present disclosure, whether the directory entry is represented by digital numbers may be determined from the characters that are included in the string of the directory entry. In one example, if the decimal rule is adopted, then the directory entry may be considered as a qualified one if the string of the directory entry includes the numbers from 0 to 9. In another example, if the octal rule is adopted, then the directory entry may be considered as a qualified one if the string of the directory entry includes the numbers from 0 to 7. In still another example, if the hexadecimal rule is adopted, then the directory entry may be considered as a qualified one if the string of the directory entry includes the numbers from 0 to 9 and the letters from "a" to "f."

Figure 8:
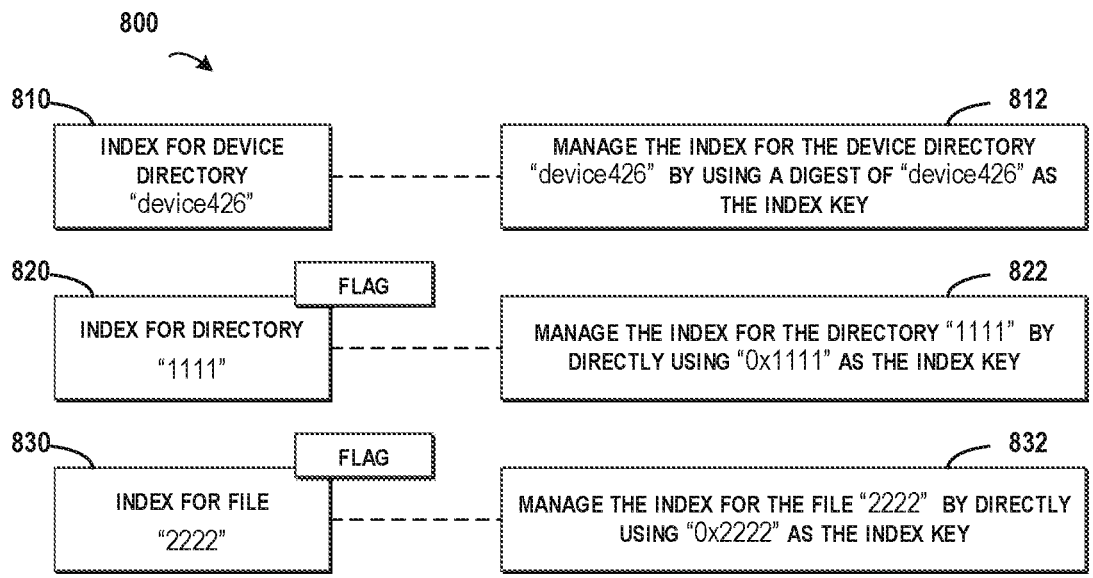
FIG. 8 depicts a diagram of flags for multiple directory entries according to one embodiment of the present disclosure.

FIG. 8 depicts an example diagram 800 of flags for multiple directory entries related to an object according to one embodiment of the present disclosure, where two of three directory entries are marked with flags indicating they are represented by digital numbers. In FIG. 8, the device directory named "device426" is a normal directory without a flag, and thus the index 810 for the device directory may be managed by a normal way shown in the block 812, where the index 810 may be managed by using a digest of "device426" as the index key. The directory named "1111" is a directory with a flag, and thus the index 820 for the directory may be managed by the way shown in the block 822, where the index 820 may be managed by directly using the digital numbers "0x1111" as the index key. The file named "2222" is a directory with a flag, and thus the index 830 for the file may be managed by the way shown in the block 832, where the index 830 may be managed by directly using the digital numbers "0x2222" as the index key.

In one embodiment of the present disclosure, the flag comprises information about type of the digital numbers. Here, the type of the digital numbers may be identified by the mark. In one embodiment of the present disclosure, a mark of "B" may indicate that the digital numbers are binary numbers, a mark of "Q" may indicate that the digital numbers are quaternary number, a mark of "O" may indicate that the digital numbers are octal numbers, a mark of "D" may indicate that the digital numbers are decimal numbers, and a mark of "H" may indicate that the digital numbers are hexadecimal numbers, etc.

Figure 9:
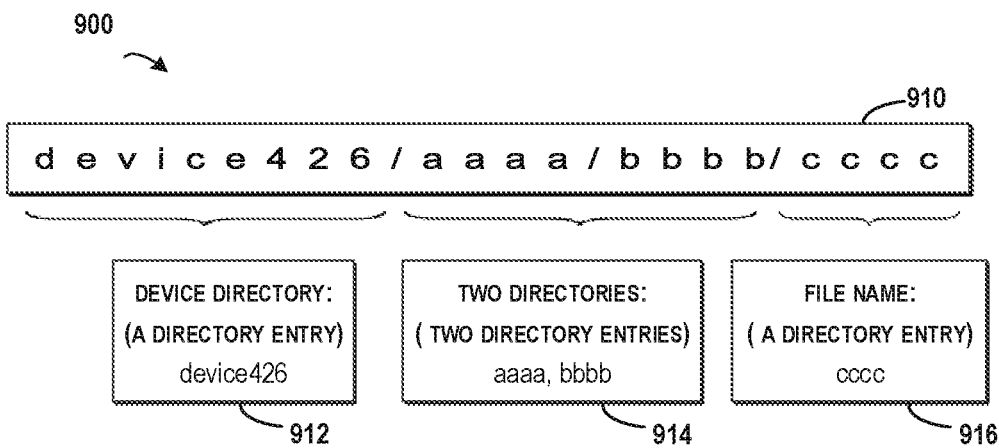
FIG. 9 depicts a diagram for a path including multiple directory entries according to one embodiment of the present disclosure.

FIG. 9 depicts an example diagram 900 for a path including multiple directory entries according to one embodiment of the present disclosure. In FIG. 9, the path 910 "device426/aaaa/bbbb/cccc" shows an example path with multiple directory entries. In FIG. 9, the device directory is named as "device426" (depicted as 912) and it cannot use the disclosed method for managing the index thereof. The directory entries "aaaa" and "bbbb" (depicted as 914) indicate two sub-directories that may adopt the disclosed method for managing the index thereof. The file "cccc" (depicted as 916) indicates the file corresponding to the object, and it may adopt the disclosed method for managing the index thereof.

Although the above paragraphs illustrate example where the file name "cccc" may be represented by digital numbers, in another example, if the file name includes other letters that are not from "a" to "f," then the disclosed method may not be applied. Here, if the file name includes a postfix such as ".abc," the disclosed method may not be applied to this type of file name.

With the above implementations, the index for a directory entry may be managed by directly using the digital numbers as the index key. Accordingly, compared with the normal solution of managing the index by using a digest of the directory entry, the time cost and the overhead of computing resources in generating the digest by a hash algorithms may be saved, further the overall performance of the storage system may be increased.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a file system in a storage system, at least one directory entry in a file system in response to receiving a request related to managing the at least one directory entry in the file system, wherein each of the at least one directory entries is represented by digital numbers;
   managing, by the file system, an index for each of the at least one directory entries in the file system, wherein an index key for the index comprises the digital numbers themselves;
   creating a directory in response to a received request to manage a directory entry of the at least one directory entry in the file system, wherein the directory entry is represented by a digital number;
   creating a directory name for the directory, the directory name includes the digital number representing the directory entry; and
   creating an index for the directory, the index including the digital number associated with the directory name and the directory entry; the digital number of the index being directly used as an index key for the created index; the digital number of the index key matching the digital number of the directory name for facilitating querying the index.

2. The method of claim 1, wherein managing, by the file system, an index for each of the at least one directory entries in the file system comprises: creating, by the file system, an index for each of the at least one directory entries in the file system in response to the request being a request related to creating the at least one directory entry.

3. The method of claim 1, wherein managing, by the file system, an index for each of the at least one directory entries in the file system comprises: reading, by the file system, an index for each of the at least one directory entries, in the file system in response to the request being a request related to reading the at least one directory entry.

4. The method of claim 1, wherein managing, by the file system, an index for each of the at least one directory entries in the file system comprises: updating, by the file system, an index for each of the at least one directory entries in the file system in response to the request being a request related to updating the at least one directory entry.

5. The method of claim 1, wherein managing, by the file system, an index for each of the at least one directory entries in the file system comprises: deleting, by the file system, an index for each of the at least one directory entries in the file system in response to the request being a request related to deleting the at least one directory entry.

6. The method of claim 1, further comprising:
indicating by a flag that the at least one directory entry is represented by digital numbers.

7. The method of claim 6, wherein the flag comprises information about the type of the digital numbers.

8. A system, comprising:
a computer system comprising: a computer processor, a computer-readable storage medium, and program instructions stored on the computer-readable storage medium being executable by the processor, to cause the computer system to perform a method, comprising:
determining, by a file system in a storage system, at least one directory entry in a file system in response to receiving a request related to managing the at least one directory entry in the file system, wherein each of the at least one directory entries is represented by digital numbers;
managing, by the file system, an index for each of the at least one directory entries in the file system, wherein an index key for the index comprises the digital numbers themselves;
creating a directory in response to a received request to manage a directory entry of the at least one directory entry in the file system, wherein the directory entry is represented by a digital number;
creating a directory name for the directory, the directory name includes the digital number representing the directory entry; and
creating an index for the directory, the index including the digital number associated with the directory name and directory entry; the digital number of the index being directly used as an index key for the created index; the digital number of the index key matching the digital number of the directory name for facilitating querying the index.

9. The system of claim 8, wherein managing, by the file system, an index for each of the at least one directory entries in the file system comprises: creating, by the file system, an index for each of the at least one directory entries in the file system in response to the request being a request related to creating the at least one directory entry.

10. The system of claim 8, wherein managing, by the file system, an index for each of the at least one directory entries in the file system comprises: reading, by the file system, an index for each of the at least one directory entries in the file system in response to the request being a request related to reading the at least one directory entry.

11. The system of claim 8, wherein managing, by the file system, an index for each of the at least one directory entries in the file system comprises: updating, by the file system, an index for each of the at least one directory entries in the file system in response to the request being a request related to updating the at least one directory entry.

12. The system of claim 8, wherein managing, by the file system, an index for each of the at least one directory entries in the file system comprises: deleting, by the file system, an index for each of the at least one directory entries in the file system in response to the request being a request related to deleting the at least one directory entry.

13. The system of claim 8, further comprising:
indicating by a flag that the at least one directory entry is represented by digital numbers.

14. The system of claim 13, wherein the flag comprises information about the type of the digital numbers.

15. A computer program product, the computer program product comprising a computer readable storage medium having program instructions embodied therewith, wherein the computer readable storage medium is not a transitory signal per se, the program instructions executable by a computer to cause the computer to perform a method, comprising:
determining, by a file system in a storage system, at least one directory entry in a file system in response to receiving a request related to managing the at least one directory entry in the file system, wherein each of the at least one directory entries is represented by digital numbers;
managing, by the file system, an index for each of the at least one directory entries, in the file system, wherein an index key for the index comprises the digital numbers themselves;
creating a directory in response to a received request to manage a directory entry of the at least one directory entry in the file system, wherein the directory entry is represented by a digital number;
creating a directory name for the directory, the directory name includes the digital number representing the directory entry; and
creating an index for the directory, the index including the digital number associated with the directory name and directory entry; the digital number of the index being directly used as an index key for the created index; the digital number of the index key matching the digital number of the directory name for facilitating querying the index.

16. The computer program product of claim 15, wherein managing, by the file system, an index for each of the at least one directory entries in the file system comprises: creating, by the file system, an index for each of the at least one directory entries in the file system in response to the request being a request related to creating the at least one directory entry.

17. The computer program product of claim 15, wherein managing, by the file system, an index for each of the at least one directory entries in the file system comprises: reading, by the file system, an index for each of the at least one directory entries in the file system in response to the request being a request related to reading the at least one directory entry.

18. The computer program product of claim 15, wherein managing, by the file system, an index for each of the at least one directory entries in the file system comprises: updating, by the file system, an index for each of the at least one directory entries in the file system in response to the request being a request related to updating the at least one directory entry.

19. The computer program product of claim 15, wherein managing, by the file system, an index for each of the at least one directory entries in the file system comprises: deleting, by the file system, an index for each of the at least one directory entries in the file system in response to the request being a request related to deleting the at least one directory entry.

20. The computer program product of claim 15, further comprising: indicating by a flag that the at least one directory entry is represented by digital numbers.

\* \* \* \* \*